United States Patent [19]

Yoshimoto et al.

[11] Patent Number: 4,470,075

[45] Date of Patent: Sep. 4, 1984

[54] METHOD AND APPARATUS FOR RECORDING A REPRODUCTION PICTURE HAVING A SUBSTANTIALLY CONTINUOUS TONE IN A PICTURE SCANNING AND RECORDING SYSTEM

[75] Inventors: Takeshi Yoshimoto; Masanari Tsuda, both of Kyoto, Japan

[73] Assignee: Dainippon Screen Seizo Kabushiki Kaisha, Kyoto, Japan

[21] Appl. No.: 396,470

[22] Filed: Jul. 8, 1982

[30] Foreign Application Priority Data

Jul. 24, 1981 [JP] Japan ................................ 56-115111

[51] Int. Cl.³ .............................................. H04N 1/22
[52] U.S. Cl. ..................................... 358/302; 346/108
[58] Field of Search ................ 358/302, 289; 346/108, 346/109; 350/174

[56] References Cited

U.S. PATENT DOCUMENTS 3,725,574  4/1973  Gast ..................................... 346/108
3,727,062  4/1973  Foster ................................. 346/108

Primary Examiner—John C. Martin
Assistant Examiner—Victor R. Kostak
Attorney, Agent, or Firm—Lackenbach, Siegel, Marzullo, Presta & Aronson

[57] ABSTRACT

In a picture scanning and recording system such as a color scanner wherein a reproduction picture is recorded by modulating a plurality of light beams each independently according to a picture signal by means of light modulator elements, a method and apparatus for recording a reproduction picture having a substantially continuous tone characterized by weighting each light beam in order of digit position of a digitized picture signal, and effecting exposure with a light beam resulting from optical addition of the light beams modulated according to such a digital picture signal.

6 Claims, 5 Drawing Figures

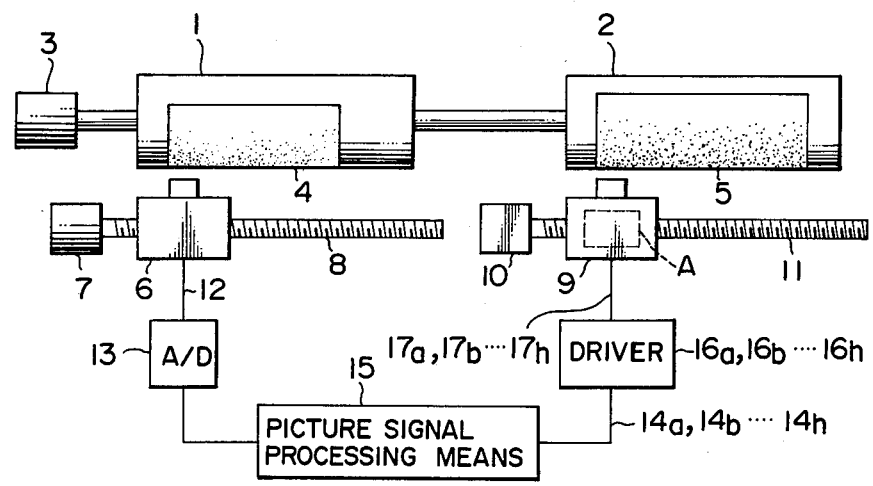
FIG. 1
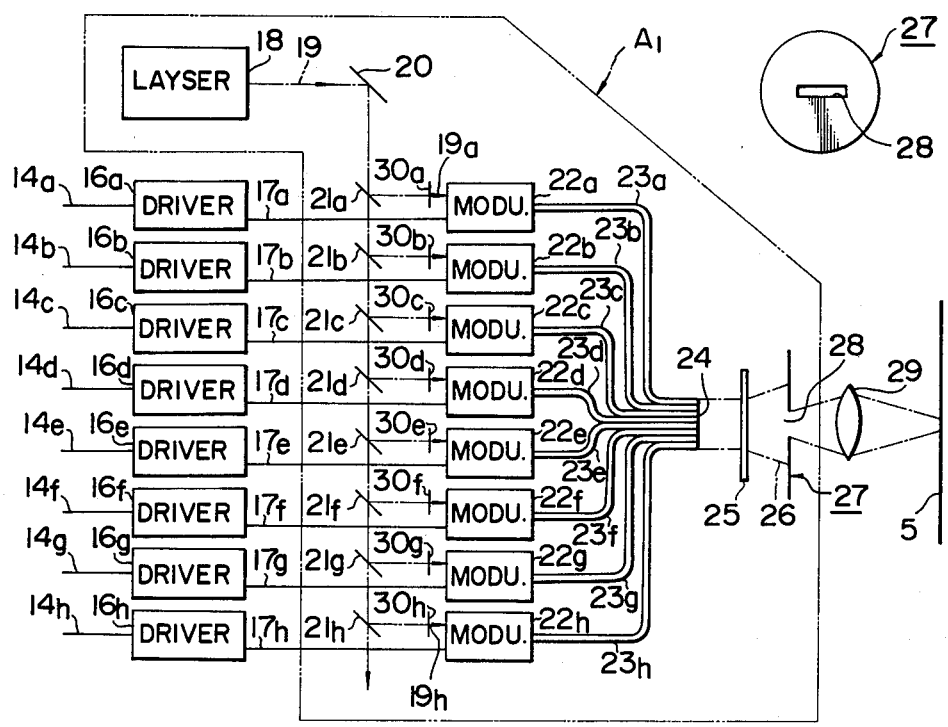
FIG. 2
FIG. 3

METHOD AND APPARATUS FOR RECORDING A REPRODUCTION PICTURE HAVING A SUBSTANTIALLY CONTINUOUS TONE IN A PICTURE SCANNING AND RECORDING SYSTEM

BACKGROUND OF THE INVENTION

This invention relates to a method and apparatus for recording a reproduction picture having a substantially continuous tone on a photosensitive material by controlling exposure means of the recording section according to a picture signal obtained photoelectrically by scanning an original picture having a continuous tone, for use in a picture scanning and recording system such as a color scanner. More particularly, it is concerned with a method and apparatus for recording a reproduction picture having a substantially continuous tone by utilizing the basic structure of the so-called dot generator wherein a plurality of light beams serving as exposure means of the recording section are controlled to be ON or OFF each independently according to a picture signal in a picture scanning and recording system.

Heretofore, in a picture scanning and recording system such as a color scanner, there have been developed and practically used various means for recording a halftone picture directly from an original picture having a continuous tone. One typical such means employs a contact screen, in which the contact screen is overlapped closely with a photosensitive material disposed on the recording cylinder, and with a light beam modulated according to a picture signal, the photosensitive material is exposed through the contact screen to thereby record a halftone picture. This method, however, involves inconveniences such that the cost is increased because the contact screen originally has a consumable factor and that the halftone dot size is unstable due to the influence of fringe.

In contrast with such a photographic method using the contact screen, there has been developed the so-called dot generator as means for forming halftone dots electrically, and recently such an electrical means has also been spreading to a fairly great extent.

In a typical known system using a dot generator, as disclosed in Japanese Patent Laying-Open Specification Nos. 52-118302 and 52-123701 and Japanese Patent Publication No. 52-33523, a plurality of light beams of the recording section are modulated and controlled to be turned ON or OFF each independently according to a picture signal thereby recording a halftone picture.

On the other hand, in a picture scanning and recording system such as a color scanner it is necessary to provide such a system for the so-called "continuous tone" whereby a reproduction picture having a continuous tone is substantially obtainable as in gravure printing and textile printing in addition to the so-called "screening" whereby a half-tone picture is obtainable directly from an original picture having a continuous tone. At present, such recording system of the type for either "screening" or "continuous tone" is used, or it is used by changing recording heads, depending on purposes of use and objects to be recorded.

SUMMARY OF THE INVENTION

It is an object of the present invention to provide a method and apparatus for recording a reproduction picture having a substantially continuous tone by controlling exposure means according to a picture signal obtained by scanning an original picture, free from the aforementioned inconveniences, which is simple in construction and is stable and economical.

According to the present invention there is provided in a picture scanning and recording system wherein a reproduction picture is recorded by modulating a plurality of light beams each independently according to a picture signal by means of light modulator elements, a method for recording a reproduction picture having a substantially continuous tone by weighting each light beam in order of digit position of a digitized picture signal, and effecting exposure with a light beam resulting from optical addition of the light beams modulated according to said digital picture signal.

According to the present invention there is also provided in a picture scanning and recording system wherein a reproduction picture is recorded by modulating a plurality of light beams each independently according to a picture signal by means of light modulator elements, an apparatus for recording a reproduction picture having a substantially continuous tone comprising means for weighting a plurality of light beams in order of digit position of a digitized picture signal, means for optically adding said light beams after modulation each independently according to said picture signal, and a slit plate for projecting the added light beam in a desired shape onto a photosensitive material.

The present invention also envisages in a picture scanning and recording system wherein a reproduction picture is recorded by applying a plurality of high-frequency signals having different oscillation frequencies to a single acousto-optical deflector element to generate a plurality of light beams and modulating said light beams each independently according to a picture signal, an apparatus for recording a reproduction picture having a substantially continuous tone comprising means for weighting a plurality of light beams in order of digit position of a digitized picture signal, means for optically adding said light beams after modulation each independently according to said picture signal, and a slit plate for projecting the added light beam in a desired shape onto a photosensitive material.

BRIEF DESCRIPTION OF DRAWINGS

In order that the present invention may be better understood, preferred embodiments thereof will be described with reference to the accompanying drawings, in which:

FIG. 1 is a plan view schematically illustrating a color scanner to which the present invention is applied;

FIG. 2 is a plan view of a picture scanning and recording system to which the first embodiment of the method of the present invention is applied;

FIG. 3 is an enlarged front view of a slit plate;

DESCRIPTION OF THE PREFERRED EMBODIMENTS

Figure 4:
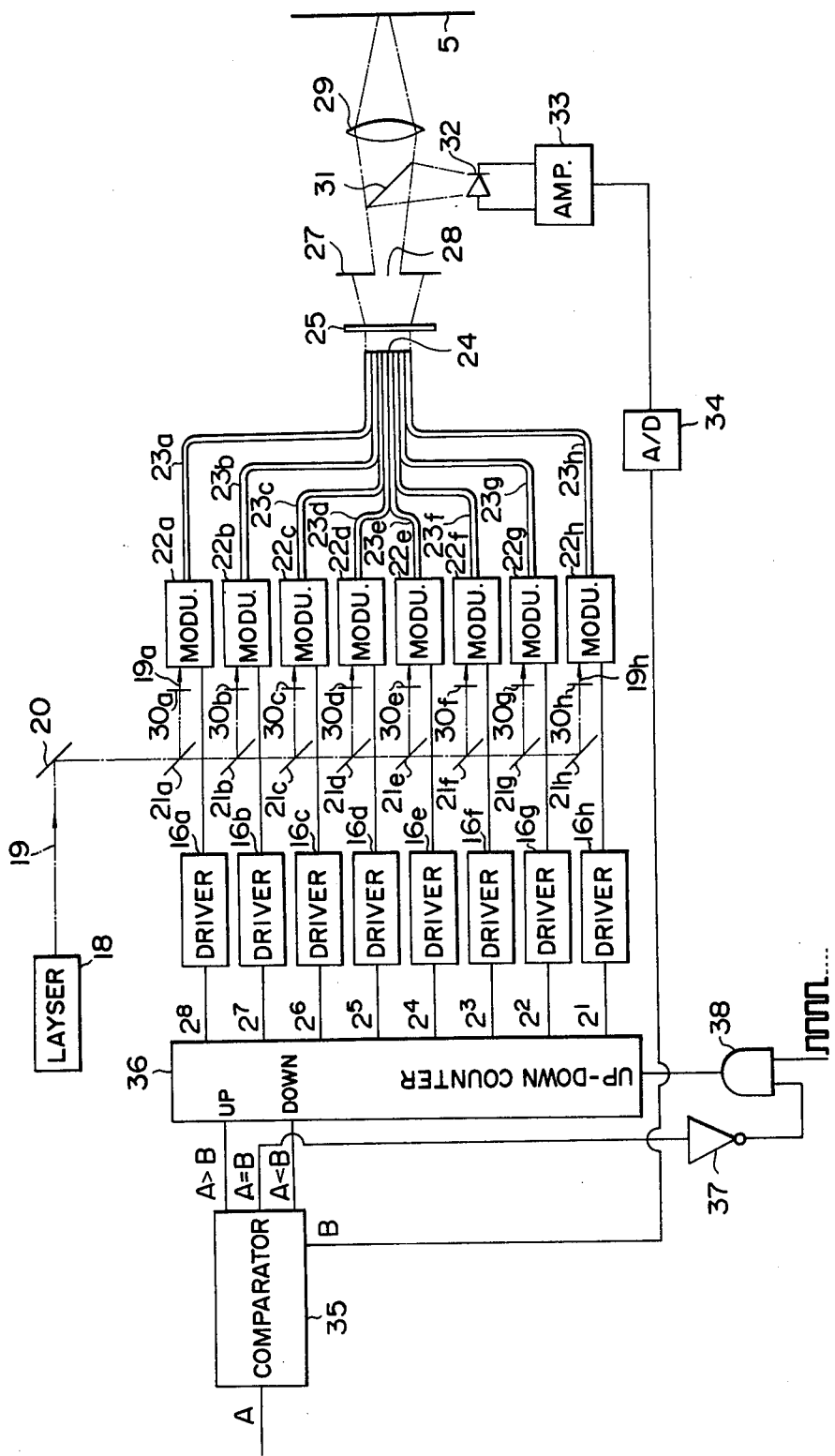
FIG. 4 is a plan view of the picture scanning and recording system of FIG. 2 to which the second embodiment of the method of the present invention is applied, wherein a feedback control circuit for the correction of luminous energy variations is added.

Referring to the drawings, there is schematically shown in FIG. 1 one embodiment of a color scanner to which the method of the present invention is applied, wherein the reference numeral 1 denotes an original picture cylinder and numeral 2 designate a recording cylinder both rotated at an equal speed by a motor 3, with an original picture 4 and a film 5 being attached to the cylinders 1 and 2, respectively.

Numeral 6 denotes a scanning head for scanning the original picture 4 photoelectrically, which is moved in the axial direction of the original picture cylinder 1 by means of a feed screw 8 which is rotated by a motor 7.

Numeral 9 shows an exposure head for recording a reproduction picture by scanning the film 5, which is moved in the axial direction of the recording cylinder 2 by a motor 10 in the same way as the scanning head 6.

An analog picture signal 12 is obtained by scanning photoelectrically the original picture 4 by means of the scanning head 6 and then is converted, for example, to digital picture signals 14a-14h successively from the most significant bit by means of an analog-digital converter 13, which in a picture signal processor 15 are subjected to processings usually applied in a color scanner such as color correction, tone correction and masking and are then input to driver circuits 16a-16h, respectively. Thereafter, signals 17a-17h output from the driver circuits 16a-16h, respectively, are input to a light beam generator A disposed within the exposure head 9.

Referring now to FIG. 2, there is shown the first embodiment of a light beam generator $A_1$ to which the method of the present invention is applied in which a light beam 19 which is generated from a light source 18 such as a laser tube and is reflected by a plane mirror 20, is divided into a plurality of light beams by a plurality of half mirrors 21a-21h disposed in parallel with each other.

Thus the divided light beams are incident to the corresponding number of weighting means, for example, ND filters 30a-30h, whereby the light beams are weighted in luminous energy ratios of 1, ½, ¼, ⅛ ... 1/128 in order of digit position of the digital picture signals 14a-14h.

The light beams 19a-19h through the ND filters 30a-30h are input to the corresponding light modulators 22a-22h and are modulated and controlled to be turned ON or OFF, i.e. so as to be passed or stopped, according to the signals 17a-17h output from the driver circuits 16a-16h, that is, according to the digital picture signals 14a-14h.

The light beams 19a-19h which have passed through the light modulators 22a-22h are transmitted by light beam transfer means 23a-23h such as optical fibers and are radiated from terminal portions 24 which are disposed in one row, two rows in zigzag, or a like manner in contact with one another in the direction of the recording cylinder's axis. Then, after passing through a diffuser 25, a duffused light 26 passes through a rectangular slit 28 formed in a slit plate 27, as shown in FIG. 3.

Consequently, the film 5 on the rotating recording cylinder 2 is scanned and exposed by a light spot which is obtained by focusing the diffused light 26 through the rectangular slit 28 onto the recording cylinder 2 by a focusing lens 29.

The luminous energy of the exposure light spot focused onto the film 5 is equal to that of the light obtained by mixing the light beams emitted from the light beam transfer means 23a-23h which are turned ON or OFF each independently according to a picture signal, by the diffuser 25. The luminous energy ratios of these light beams equal 1, ½, ¼ ... 1/128, as previously mentioned. Therefore, the luminous energy of the combinations of light beams passed through the modulators 22a-22h can be varied in the range of 0 to 255/128 every 1/128; as a result, a reproduction picture having a substantially continuous tone corresponding to the picture signal is recorded on the film 5 successively in order of the scanning lines.

By making the length of the foregoing light spot in the direction of the recording cylinder's axis equal to the scanning pitch of the film 5, the occurrence of scanning fringe caused by non-exposure or overlapped exposure between adjacent scanning lines can be prevented.

In the hereinbefore described picture scanning and recording system, while the film 5 is scanned by using the light beams 19a-19h, the light beams 19a-19h are controlled to be turned ON or OFF each independently according to the digital picture signals 14a-14h, thereby recording a reproduction picture having a substantially continuous tone. Therefore, the present invention can be easily applicable to a color scanner provided with the foregoing dot generator.

In short, according to the present invention, the light beams 19a-19h radiated from the terminal portions 24 of the optical fibers 23a-23h are mixed by the diffuser 25, and then the diffused light beam through the slit 28 is focused onto the film 5 by the lens 29. Therefore, the film 5 is scanned by an even light having a luminous energy equal to the sum of quantities of the light beams 19a-19h, that is, a luminous energy proportional to the density of the original picture 4, whereby a reproduction picture having a substantially continuous tone is recorded.

In the aforementioned embodiment of the light beam generator, although the ND filters 30a-30h for weighting the divided light beams are arranged before the light modulators 22a-22h, they may be disposed after those light modulators in the optical paths and this arrangement causes no trouble in practical use. The light beam dividing means are not limited to the foregoing half mirrors. Furthermore the light beams divided in plural numbers by light beam dividing means may be incident upon the corresponding light modulators through the light beam transfer means such as the optical fibers.

In FIG. 4, there is shown the second embodiment of a light beam generator according to the present invention, which has the same construction as the one shown in FIG. 2, except a luminous energy correction circuit for correcting disturbance against the light beam transmission system and variations of the light source such as a laser tube is provided, in which the same reference numerals or marks as those of FIG. 2 represent the same parts. In this embodiment, the correction of variations of the luminous energy is performed in the following manner.

In the light path between the slit plate 27 and the focusing lens 29 is disposed a half mirror 31 whereby the light beam to be used for recording a reproduction image is divided. Then, the divided light beam is incident upon a photo detector 32, and thereby subjected to photoelectric conversion therein. The resulting signal is input to an analog-digital converter 34 through an amplifier 33, in which a digital signal B of 8 bits is resulted by the analog-digital conversion and is sent to a comparator 35. In the comparator 35 the digital signal B is compared with the picture signal A of 8 bits.

For example, in case A is larger than B, since the signal input from the comparator 35 to an inverter 37 is a low-level signal L, clock pulses are input to an up-down counter 36 through an AND gate 38. The counter 36 is counted up until A becomes equal to B and a high-level signal H is input to the inverter 37 from the comparator 35, that is, a feedback control is effected so that the sum of the light beams emitted from the terminal portions 24 of the light beam transfer means 23a–23h may correspond exactly to the picture signal A.

Also in case A is smaller than B, clock pulses are fed to the up-down counter 36 to count down the latter until A becomes equal to B, that is, a feedback control is effected so that the sum of light beams emitted from the terminal portions 24 of the light beam transfer means 23a–23h may correspond exactly to the picture signal A.

As will be apparent from the above description, in practice, by merely performing such simple operations as insertion and removal or replacement of a filter, a diffuser, etc. the present invention can be used as a dot generator to effect the halftone exposure with a single exposure head.

Figure 5:
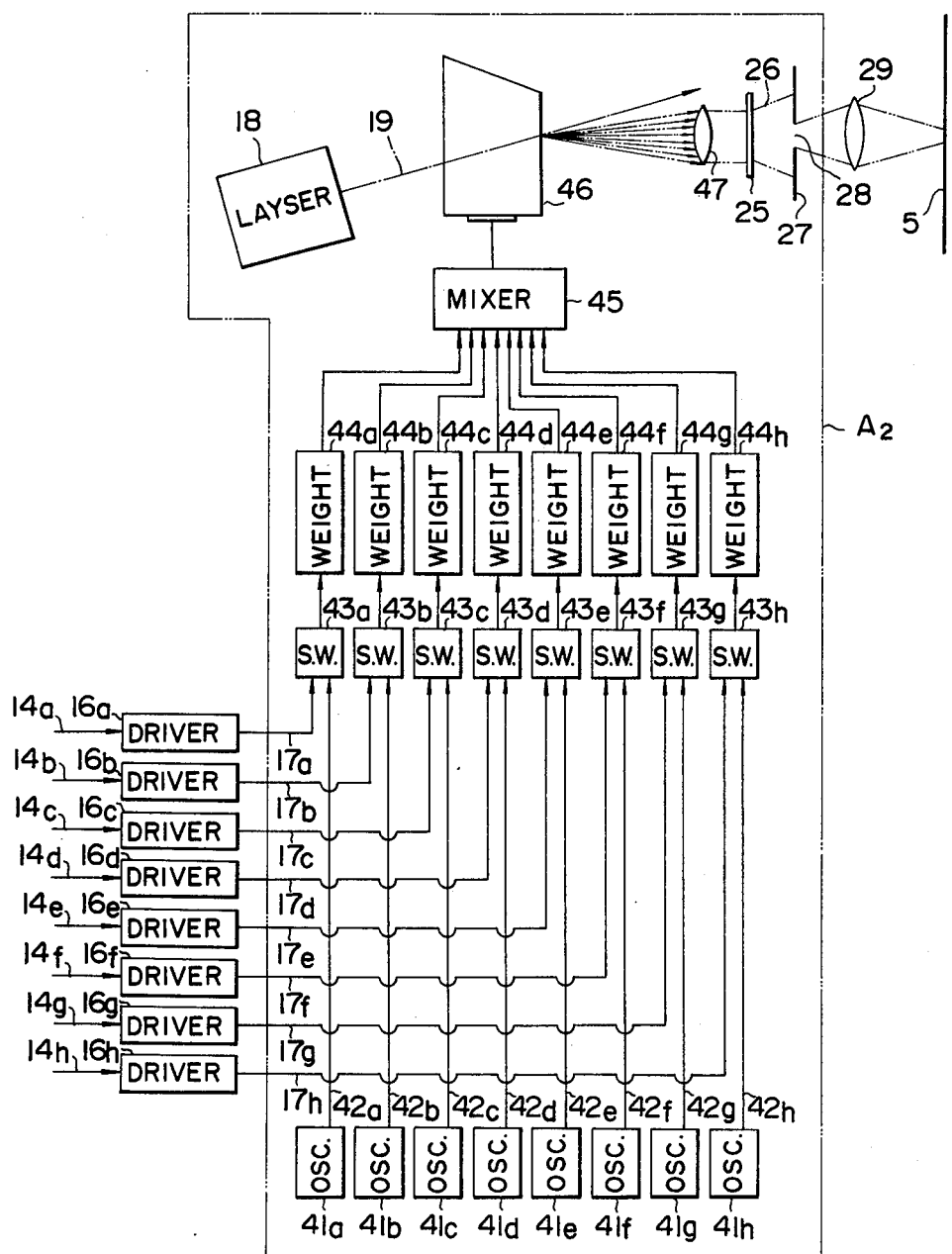
FIG. 5 is a plan view of a picture scanning and recording system to which the third embodiment of the method of the invention is applied.

Referring now to FIG. 5, there is shown the third embodiment of a light beam generator $A_2$ to which the method of the present invention is applied, in which the same reference numerals or marks as those in the first embodiment represent the same parts.

Numerals 41a–41h denote high-frequency oscillators having stepwise different oscillating frequency zones in correspondence to the digital picture signals 14a–14h. The outputs 42a–42h of the high-frequency oscillators 41a–41h are input to switches 43a–43h, respectively, together with the outputs 17a–17h generated from the corresponding driver circuits 16a–16h and are intermitted therein correspondingly to the digital picture signals 14a–14h.

The oscillators' outputs 42a–42h passed through the switches 43a–43h are weighted in order of digit position of the digital picture signals 14a–14h by weighting scalers 44a–44h, respectively, then mixed by an addition mixer 45 and fed to an acousto-optical light deflector 46.

Then, light beams generated by the light source 18 such as a laser tube and having luminous energies proportional to the voltages of the weighted outputs 42a–42h of the oscillators 41a–41h are deflected at angles corresponding to the frequencies of the outputs 42a–42h of the oscillator 41a"41h in the acousto-optical light deflector 46, then, like the foregoing first embodiment, pass through the diffuser 25 by way of a lens 47, and the resultant diffused light passes through the slit 28 of the slit plate 27 and further through the lens 29, whereby exposing the film 5 to record a reproduction picture having a substantially continuous tone.

Such a picture scanning and recording system, as in the foregoing first embodiment, can be utilized as a dot generator which directly records a halftone picture from an original picture having a continuous tone by such simple operations as insertion and removal or replacement of a filter, a diffuser, etc., as disclosed in Japanese Patent Laying-Open Specification No. 52-101101.

This embodiment affords the same effects as that referred to in the foregoing embodiments.

Mainly the apparatus of the present invention has been described above while giving examples, from which the method of the invention will also be fully understood.

Although the present invention has been described in some detail by way of illustration and examples for purposes of clarity of understood, it will, of course, be understood that various changes and modifications thereof may be made in the form, details, and arrangements of the parts without departing from the scope of the present invention.

What is claimed is:

1. In a picture scanning and recording system wherein a reproduction picture is recorded by modulating a plurality of light beams each independently according to a picture signal by means of light modulator elements, a method for recording a reproduction picture having a substantially continuous tone by weighting each light beam in order of digit position of a digitized picture signal, and effecting exposure with a light beam resulting from optical addition of the light beams modulated according to said digital picture signal.

2. A method according to claim 1, wherein each said light beam weighted in order of digit position of said digital picture signal is increased or decreased according to the difference between said digital picture signal and a digital signal corresponding to said light beam resulting from the optical addition of the light beams modulated according to said digital picture signal.

3. In a picture scanning and recording system wherein a reproduction picture is recorded by modulating a plurality of light beams each independently according to a picture signal by means of light modulator elements, an apparatus for recording a reproduction picture having a substantially continuous tone comprising means for weighting a plurality of light beams in order of digit position of a digitized picture signal, means for optically adding said light beams after modulation each independently according to said picture signal, and a slit plate for projecting the added light beam in a desired shape onto a photosensitive material.

4. An apparatus according to claim 3, wherein said means for weighting a plurality of light beams comprises a combination of ND filters disposed in optical paths of said light beams.

5. An apparatus according to claim 3, wherein said means for optically adding the modulated light beams comprises a diffuser.

6. In a picture scanning and recording system wherein a reproduction picture is recorded by applying a plurality of high-frequency signals having different oscillation frequencies to a single acousto-optical deflector element to generate a plurality of light beams and modulating said light beams each independently according to a picture signal, an apparatus for recording a reproduction picture having a substantially continuous tone comprising means for weighting a plurality of light beams in order of digit position of a digitized picture signal, means for optically adding said light beams after modulation each independently according to said picture signal, and a slit plate for projecting the added light beam in a desired shape onto a photosensitive material.

* * * * *